United States Patent

[11] 3,543,726

[72] Inventor Albert F. Marsh
     14232 Brookhurst, Garden Grove, California 92640
[21] Appl. No. 709,248
[22] Filed Feb. 29, 1968
[45] Patented Dec. 1, 1970

[54] EGG INCUBATOR
     9 Claims, 5 Drawing Figs.
[52] U.S. Cl. ................................................. 119/37
[51] Int. Cl. ............................................. A01k 41/00,
                                                      A01k 41/06
[50] Field of Search ................................... 119/37, 44,
                                                      35, 40, 42

[56] References Cited
     UNITED STATES PATENTS
     960,476   6/1910  Zimmerman ............... 119/40
     962,594   6/1910  Sherman .................... 119/42
     1,635,901 7/1927  Oller .......................... 119/35
     2,470,046 5/1949  Napier ........................ 119/37
     2,764,959 10/1956 Church ....................... 119/37
     3,088,436 5/1963  Lyon .......................... 119/37

Primary Examiner—Hugh R. Chamblee
Attorney—Noel G. Conway

ABSTRACT: An egg incubator having a generally circular horizontal vented support platform at a position slightly above a base, and a plurality of spokes disposed in a circular ring with said spokes radiating from the center of the platform, which spokes are disposed slightly above the platform and are supported for movement by a carrier ring which is slidably supported by the base and is indexed by the platform; and there is provided a circular cover for the incubator which cover is removably disposed on the base for rotational movement relative to the base, and there is provided means for transmitting rotary motion of the cover to said ring of spokes and thence to eggs disposed on the platform between said spokes in order to turn the eggs without opening the cover. Additionally, there is provided a heat source disposed at the center of the ring of spokes and the heat source is positioned to prevent newly hatched chicks from getting into a liquid supply container within the incubator.

Patented Dec. 1, 1970

3,543,726

INVENTOR.
ALBERT F. MARSH
BY Noel G. Conway
ATTORNEY

EGG INCUBATOR

This invention relates to egg incubators, and more particularly to such incubators with improved means for turning eggs contained therein without opening the interior of the incubator.

In order to maximize the number of live chicks resulting from a batch of incubated eggs, the temperature should be kept very constant. Additionally, the eggs must be turned at regular intervals. These two factors make it extremely desirable that there be some means provided whereby the eggs within the incubator can be turned at without the necessity of opening the incubator. Even though a heat source can be provided which would rapidly build the temperature back up to the proper temperature, there would be a certain thermal shock on the eggs to which thermal shock oftentimes lowers the quality and quantity of the chicks produced from a batch of eggs. Additionally, if it is unnecessary that the operator continually open the incubator to turn the eggs, he is able to use less-costly heat control equipment, and heat sources having a lesser capacity.

Embodiments of the present invention incorporate the feature of being able to turn the eggs without opening the incubator. Additionally, the particular incubators of the present invention include a unique display of the eggs relative to heat source in order to further equalize the heat to which each egg is subjected. Also certain embodiments of the present invention lend themselves to accomplishing the above desired features and yet lend themselves to economical construction.

With the foregoing in mind, it is a major object of this invention to provide an improved egg incubator.

Another object of this invention is to provide an improved egg incubator having the capability of turning the eggs within it without opening the egg incubator.

A further object of this invention is to provide an egg incubator which can provide for adequate ventilation of the interior of the incubator without the danger of any draft of incoming air hitting the eggs.

It is still a further object of this invention to provide an egg incubator wherein the eggs are disposed equidistant from the heat source in order to further equalize the temperature to which the eggs are subjected.

Another object of this invention is to provide an egg incubator of lightweight construction which can be economically produced.

It is still another object of this invention to provide an egg incubator having an improved arrangement which prevents newly hatched chicks from getting into the liquid supply container within the incubator.

Other and further objects of this invention will become apparent in the detailed description below in conjunction with the attached drawings wherein.

Figure 1:
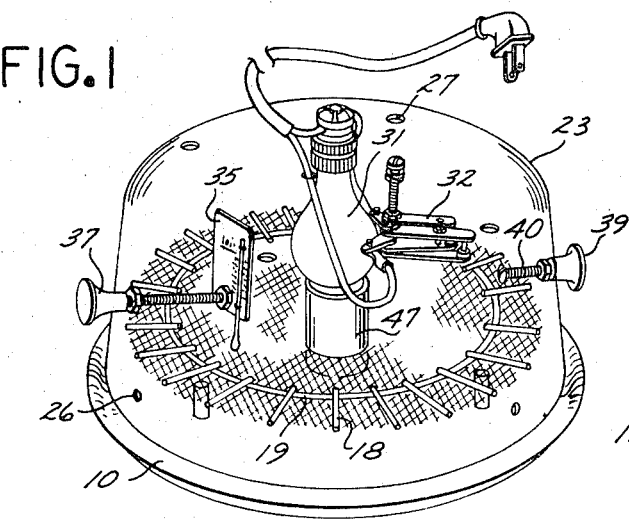
FIG. 1 is a perspective view of a preferred embodiment of the present invention.

Referring now to the drawings, the incubator preferably includes a circular base 10 having a screen 11 disposed slightly above the base on a plurality of plastic posts 12. Preferably, the screen 11 is secured to the top of the posts 12 by application of heat. As can be seen, the screen 11 (called hardware cloth) has a circular shape and provides a support platform with a plurality of holes through which air can freely circulate. Disposed at the outer edge of the base 10 is an upwardly facing recess 14, which recess operates in a manner to be described.

Encircling the screen 11 there is provided a carrier ring, or cylindrical sleeve, 16 which is slidingly supported on the base 10 for rotary movement around the screen. The ring 16 is preferably made of transparent material in order that it will not obstruct the view of the eggs within the incubator. In FIG. 1, the carrier ring 16 has been removed for clarity.

Disposed within the carrier ring 16 is a plurality of spokes 18, each of which extend radially from the center of the base of the incubator, and are connected at their inward ends to a hoop 19. The outer end of each of the spokes 18 extends through a hole 20 in the carrier ring 16. It will be noted that the holes 20 are disposed slightly above the level of the screen 11 at a position where the hoop 19 will clear the screen and will not drag when the ring is rotated relative to the screen. An egg is disposed between each pair of spokes 18. Therefore, when the carrier ring 16 is rotated, the spokes 18 engage the eggs at a very low position to turn the eggs.

The use of the spokes 18 is preferred because they are very economical to produce. However, other means could be used to provide egg engagement sections which would function on the eggs in the same manner as the spokes 18.

The preferred embodiment is also provided with a cover 23 comprising a circular side wall 24 and a top 25. This cover 23 is preferably transparent so that the eggs within the incubator can be viewed without opening the incubator. Near the lower edge of the circular side wall 24 there is provided a plurality of lower vents 26, while a plurality of upper vents 27 are provided in the top 25. The particular arrangement of the lower and upper vents 26 and 27 respectively, will be described further below.

Disposed at the center of the top 25, there is provided a handle 29 for facilitating the removal of the cover 23 with the use of only one hand.

Some source of heat for the interior of the incubator must be provided. Preferably, this heat source takes the form of a socket 30 extending through the handle 29, which socket receives therein a resistance light bulb 31. The resistance light bulb 31 illuminates the interior of the incubator and provides heat as desired. Also, the use of the light bulb has the advantage that light bulbs are very cheap, and the particular structure of the light bulb gives an additional advantage which will be described further below.

In order to turn the light bulb 31 on and off at proper times, there is provided a bimetal thermostat 32 secured to the cover 23 by a bolt 33. This thermostat 32 is mechanically adjusted until it turns on and off at the right temperature. In order to observe that the proper temperature is being maintained, there is provided a thermometer 35, which, through the use of a bolt 36 is secured to handle 37 on the exterior side of the circular side wall 24. It will be noted that the thermometer 35 is located at a position where it is the same distance from the heat source (i.e., light bulb 31) as all of the eggs 21.

On the side of the circular side wall 24 opposite the handle 37, there is provided a handle 39 which is secured to the said side wall by means of a bolt 40. Therefore, by grasping the handles 37 and 39, the cover 23 can be rotated clockwise or counterclockwise relative to the base with the upwardly facing recess 14 furnishing a track to maintain the cover in proper relation with the base.

Figure 5:
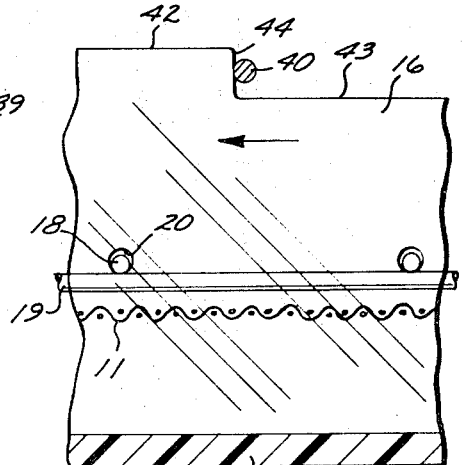
Figure 2:
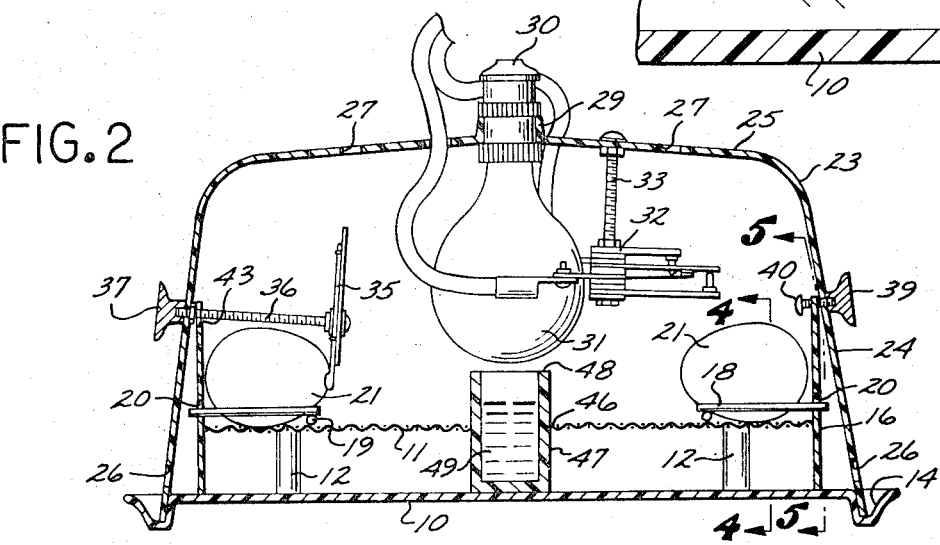
FIG. 2 is a cross-sectional elevation view of the incubator in FIG. 1.

In order to interconnect the motion of the cover 23 with the plurality of spokes 18, the following means are preferably used. At its upper edge 42, the carrier ring 16 is provided with a plurality of relatively large notches 43. There is an even number of notches 43, and they are sized such that both the bolt 40 and the bolt 36 will engage an upstanding edge, or wall, 44 at an end of a notch 43. See FIG. 5 wherein it is illustrated that movement to the left of the bolt 40 causes a like movement of the carrier ring 16, and therefore, the spokes 18. Such movement would cause an egg 21 to roll as indicated by the arrow 45.

The notches 43 are made fairly wide in order to facilitate the indexing of the cover 23 with the bolts 36 and 40 received in appropriate ones of the notches 43. Then, by grasping the handles 37 and 39, the operator can rotate the cover 23 counterclockwise to turn the eggs 21 the desired amount. Then, later, he can grasp the handles 37 and 39 and rotate the cover 23 clockwise sufficient to move the bolts 36 and 40 to the opposite ends of the respective notches 43, and then cause the carrier ring 16 and the spokes 18 to be moved sufficiently to rotate the eggs 21 the desired amount.

It is desired that there be means to maintain the moisture content within the incubator at a somewhat elevated level. To this end, there is provided a hole 46 in the screen 11 immediately below the light bulb 31. Removably received in the hole 46 is a cup 47 having a circular upper edge, or lip, 48 in close proximity to the light bulb 31. The cup 47 receives water 49 therein.

With this arrangement, the evaporation of the water is maximized since it is much closer to the light bulb 31 than the eggs. Additionally, the light bulb 31 has sufficient size and it is so close to the upper edge 48 that it efficiently prevents a newly hatched chick from getting into the cup 47 and drowning. This is a problem in prior incubators.

Figure 3:
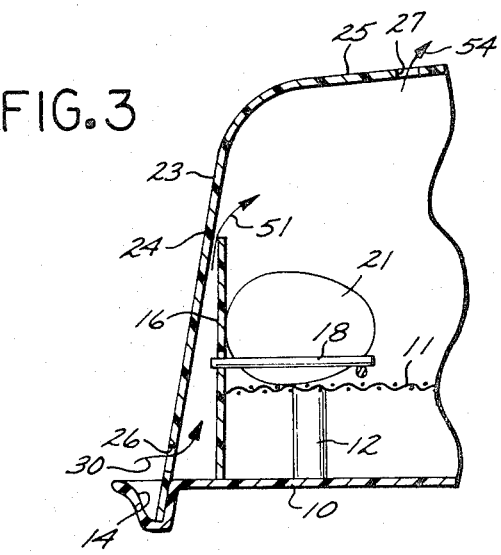
FIG. 3 is an enlarged fragmentary cross-sectional view of the incubator in FIG. 1 disclosing the path of the air entering and exiting the incubator.
Figure 4:
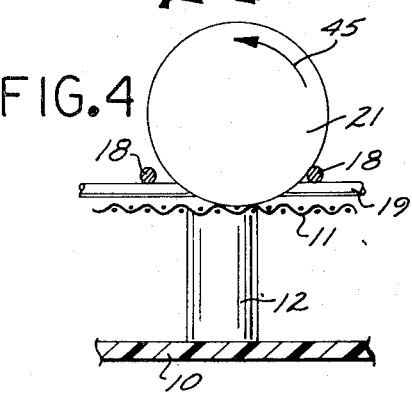
FIG. 4 is an enlarged fragmentary cross-sectional view, taken along line 4–4 in FIG. 2, disclosing the manner in which a portion of the incubator turns the eggs when desired; and, FIG. 5 is an enlarged fragmentary view, taken along line 5–5 in FIG. 2, disclosing the manner in which motion of the incubator cover is transmitted to the portion of the incubator which turns the eggs.

During the incubating process, there must be a flow of air through the incubator. Air enters the incubator through the lower vents 26, as indicated by arrow 50. (See FIG. 3 in particular.) The carrier ring 16 forms a baffle, and therefore, the air travels up between the side wall 24 and the carrier ring as indicated by arrow 51. After the air rises past the top of the ring 16, the path of the air tends to curve downward since the air is cooler than the other air already in the incubator. However, since the upper edge of the ring 16 is substantially above the level of the top of the eggs 21, the air doesn't hit the eggs until after there is a general mixing of the incoming air with the warmer air in the incubator.

Air exits the incubator through the vents 27 as indicated by arrow 54. It should be noted that the vents 27 are disposed radially inwardly of the ring of eggs 21 (as compared to the incubator central axis on which is located the light bulb 31). Therefore, the incoming air tends to have a path from the outer side of the ring of eggs 21 to the inner side of the said rings.

While only a few embodiments of the present invention have been shown and described in detail, it will be apparent to those skilled in the art that such is by way of illustration only, and numerous changes can be made thereto without departing from the spirit of the present invention.

I claim:

1. An improved egg incubator comprising:
   a base;
   a horizontal support platform supported on said base at a position sightly above said base, said support platform having a plurality of air passages therethrough;
   a plurality of adjacent egg engagement sections spaced apart sufficiently that an egg may be disposed between each pair of adjacent sections and be supported on said platform;
   a cover supported on said base and separating the interior of the incubator from the exterior;
   means for moving said sections sufficiently to turn substantially an egg between each pair of adjacent sections, said last mentioned means being operable from the exterior of the incubator when said cover is located on said base;
   a heat source disposed within said incubator;
   thermostatic control means located within said incubator when said cover is on said base for causing said heat source to tend to maintain a constant temperature within said incubator when said cover is on said base;
   a liquid supply container disposed within said incubator, said liquid supply container having an open mouth defined by a continuous lip; and
   said heat source being positioned substantially closer to said liquid supply container than said section, said heat source being positioned in said incubator in such close proximity to said mouth that a newly hatched chick could not get between the lip and the heat source, whereby the position of the heat source causes the liquid supply container to receive a more concentrated amount of heat than eggs located between said spokes thus maximizing the evaporation of liquid in said container and said position also causes the heat source to guard against a newly hatched chick falling into the liquid supply container.

2. An improved egg incubator comprising:
   a base;
   a horizontal support platform supported on said base at a position slightly above said base, said support platform having a plurality of air passages therethrough;
   A plurality of spokes disposed in a circular ring spaced apart sufficiently that an egg may be disposed between each pair of adjacent spokes and be supported on said platform;
   a carrier ring disposed around said platform on said base, said carrier ring supporting said ring of spokes;
   a cover supported on said base and separating the interior of the incubator from the exterior;
   means for moving said ring of spokes sufficiently to turn substantially an egg between each pair of adjacent spokes, said last mentioned means including interconnecting means on said cover engaging said ring such that when said cover is rotated said carrier ring is rotated and said spokes are rotated causing said spokes to be moved horizontally relative to said support platform to rotate eggs disposed between said spokes;
   a heat source disposed within said incubator; and
   thermostatic control means located within said incubator when said cover is on said base for causing said heat source to tend to maintain a constant temperature within said incubator when said cover is on said base.

3. The incubator set forth in claim 2 wherein:
   said base is circular;
   an upstanding cup is disposed at the center of the base and is adapted to receive therein water, said cup having an opening at its upper side formed by an upper edge; and
   said heat source has sufficient size to substantially cover said opening in the cup to prevent any chick from getting into the cup.

4. The incubator set forth in claim 3 wherein said upstanding cup is removable.

5. The incubator set forth in claim 2 wherein:
   said base is circular;
   said carrier ring includes an upstanding cylindrical wall rotatably disposed on said base, said wall supporting said ring slightly above said platform; and
   said interconnecting means includes a portion of said cover which cooperates with a portion of said upstanding wall to impart any rotary movement of the cover to said wall and thence to said ring.

6. The incubator set forth in claim 2 wherein:
   said base is circular;
   said cover has a generally circular outer wall;
   said ring is circular; and
   said heat source is located within the incubator above the center of the base.

7. The incubator set forth in claim 2 wherein:
   said carrier ring includes a circular upstanding wall rotatably supported on said base, said wall being substantially solid and having an upper edge located above the support platform a distance slightly greater than the diameter of an egg;
   said cover has a generally circular side wall and a top extending across the incubator from the top of said side wall; and
   a plurality of lower vents are provided in said circular side wall at a position below the level of the upper edge of said circular upstanding wall, and a plurality of upper vents in the top of the cover, whereby air entering the first mentioned lower vents will be deflected by said upstanding wall away from eggs disposed between said spokes.

8. The incubator set forth in claim 2 wherein:
   said support platform has a circular outline;

said carrier ring includes a circular upstanding wall terminating at an upper edge which is above the level of at least part of each egg disposed between said spokes of said ring; and said circular wall has a diameter slightly larger than the diameter of said screen, whereby the circular wall can be received around said screen and indexed by said screen.

9. The incubator set forth in claim 2 wherein:

said base is circular;

said heat source is disposed above the center of said base;

said ring is circular with a predetermined diameter and is centered on the center of said base; and said thermostatic control means is disposed at a position located just above said ring.